C. G. TATE.
WHEEL.
APPLICATION FILED JAN. 20, 1913.
1,159,289.
Patented Nov. 2, 1915.
2 SHEETS—SHEET 2.
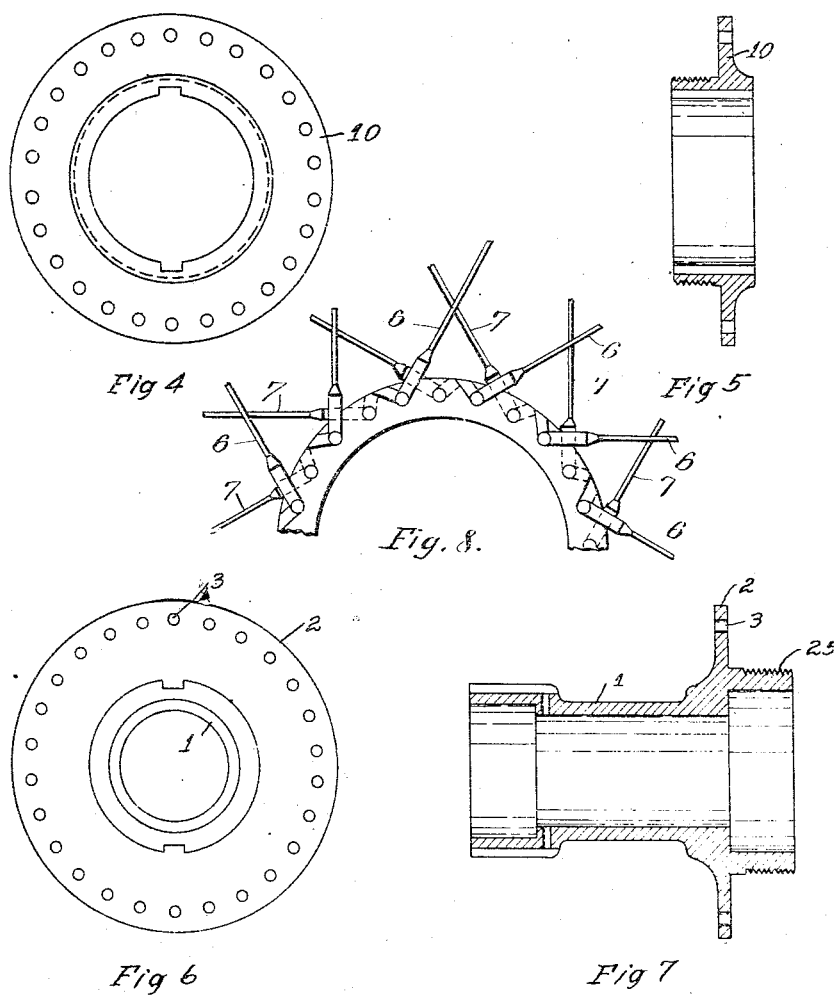
WITNESSES
INVENTOR
ATTORNEY

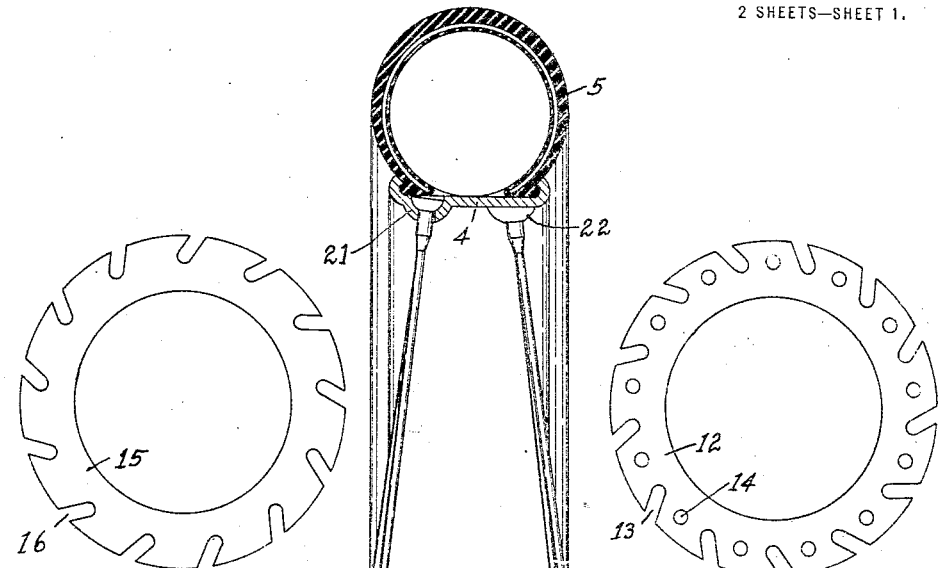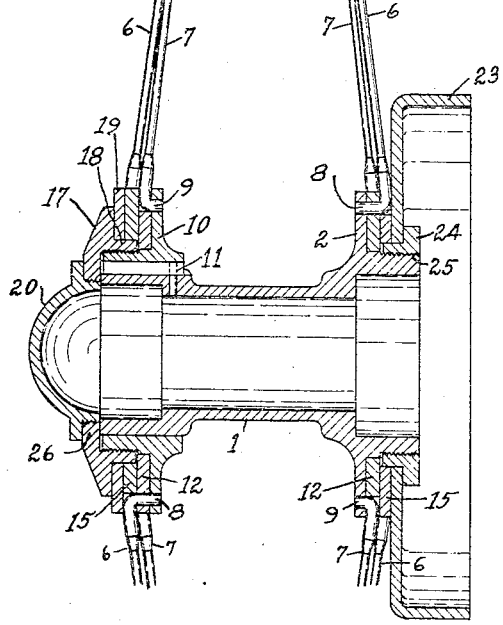

UNITED STATES PATENT OFFICE.

CHARLES G. TATE, OF CHICAGO, ILLINOIS, ASSIGNOR, BY MESNE ASSIGNMENTS, TO EDWIN A. BENSON, OF CHICAGO, ILLINOIS.

WHEEL.

1,159,289.   Specification of Letters Patent.   Patented Nov. 2, 1915.

Application filed January 20, 1913. Serial No. 743,011.

*To all whom it may concern:*

Be it known that I, CHARLES G. TATE, a citizen of the United States, residing at Chicago, in the county of Cook and State of Illinois, have invented a certain new and useful Improvement in Wheels, of which the following is a specification.

My invention relates to that class of wheels in which the tension is produced on the spokes by separating them at their inner ends, and has for its object to accomplish the above result in a simpler manner than has heretofore been done.

My invention consists of the combination hereinafter described and claimed.

My means of accomplishing the foregoing may be more readily understood by having reference to the accompanying drawings, which are hereunto annexed and are a part of this specification, in which:

Figure 1 is a vertical sectional view through a wheel constructed in accordance with my invention. Fig. 2 is a detail view of the outer spoke spacing ring. Fig. 3 is a detail view of the inner spoke spacing ring. Figs. 4 and 5 are detail views of the tension flange. Figs. 6 and 7 are detail views of the hub. Fig. 8 is a partial side view of the wheel.

Similar reference numerals refer to similar parts throughout the entire description.

As shown in the drawings, 1 is the hub which is formed of a cylindrical sleeve, which is provided with a flange 2, which is formed integral with the sleeve and is provided with a plurality of holes 3 adapted to receive the ends of the spokes.

4 is the rim to which is secured a tire 5 in the usual customary manner.

6 and 7 are spokes which are formed of uniform length and provided with bends at their inner ends, which are adapted to engage holes in the flange of the hub, the bent ends 8 of the spokes 6 being approximately twice as long as the bent ends 9 of the spokes 7, the object of which will be hereinafter described. 10 is a flange corresponding to the one formed integral with the hub sleeve, but it is detachably mounted upon the hub, being splined upon a key 11 which prevents its rotation, permitting a free longitudinal movement.

12 is an annular washer which is provided with peripheral slots 13 which are angularly inclined the lower part corresponding to alternate openings 3 in the flanges 2, and 10 and in which the spokes rest.

14 are apertures provided intermediate the slots and coinciding with the remaining openings 3 in the flange 2.

15 is an annular washer provided with peripheral slots 16 which are angularly inclined the lower part of which coincides with the openings or apertures 14 in the washer 12 and in which the ends of the spokes 6 rest, the long ends 8 extending through the apertures 14 in the washer 12 and alternate openings 3 in the flange 2. A similar pair of washers are located at the opposite end of the hub adjacent the flange 10.

17 is a nut which is provided with an inwardly extending flange 28 which engages the end of the hub sleeve 1, and this nut is mounted upon external threads cut upon the laterally extending cylindrical portion of the flange 10.

19 is a washer which is located intermediate the nut 17 and the washer 15.

20 is a hub cap fitted to threads cut in the nut 17, serving to close the interior of the sleeve 1, and protecting it from dirt, dust, etc. The wheel is assembled as follows: The spokes 7 are inserted in the sockets 21 in every other one of the rim 4. The annular washer 12 is then placed upon the hub sleeve 1 adjacent the flange 2. The short bent ends 9 of the spokes 7 are then inserted in alternate openings 3 and rest in the peripheral slots 13 formed in the washer 12. The spokes 6 are then inserted in the remaining sockets on that side of the rim. The washer 15 is then placed adjacent the washer 12, and the long bent ends 8 of the spokes 6 are inserted through the slots 16 formed in the washer 15 and the apertures 14 in the washer 12 and into the openings 3 in the flange 2. The washers 12 and 15 must be placed so that the slots 16 in the washer 15 and the slots 13 in the washer 12 are divergent, so that the material forming the washers will bear against the inner portion of the bent ends of the spokes and strengthen them. As illustrated the brake drum 23 which is a flanged disk is then mounted so that the inner portion is intermediate the washer 15 and a nut 24. The nut 24 is screwed on to threads 25 cut upon the hub sleeve 1, and this nut is turned up until the washers 12 and 15 are pressed tightly upon the flange 2. Spokes 7 are then inserted in every other one of the corresponding sockets 22 in the rim and the flange 10 is slipped onto the key 11 and the washer 12 is placed in position, and the bent ends 9 of the spokes mounted, as described, on the opposite side of the hub. The washer 15 is then placed in position and the spokes 6 are placed in the remaining sockets 21 and the ends 8 mounted in the slots 16, the bent ends 8 passing through the apertures 14 and into the openings formed in the flange 10 corresponding to the openings 3 formed in the flange 2. A washer 19 is then placed adjacent the washer 15 and the nut 17 is then screwed upon the threads until it clamps the spokes and washers securely in position and then as the flange 26 prevents its inward movement, it operates to draw the flange 10 and with it the spokes outwardly, thereby putting a tension upon them. This construction insures a wheel in which the tension upon the spokes is absolutely uniform and as a consequence will have less tendency to get out of true than where the old-fashioned method of tightening each individual spoke is employed.

Having described my invention, what I regard as new and desire to secure by Letters Patent is:

1. A wheel comprising the combination with a rim of spokes detachably secured to said rim, the inner ends of said spokes being bent at an angle, the bent ends of alternate spokes being twice as long as the adjacent ones, a sleeve which forms the hub, a fixed flange on said hub having apertures therein to receive the bent ends of one-half of the spokes, an annular washer having peripheral slots in which the spokes having the short bent ends rest, there being apertures intermediate the slots through which the ends of the spokes having the long bent ends pass, an annular washer provided with peripheral slots in which said spokes rest, the end of the sleeve being threaded and a nut mounted thereon which holds the washers rigidly against the fixed flange, a corresponding flange having apertures similar to the fixed flange to which the other one-half of the spokes are secured splined on the other end of the sleeve having a laterally projecting cylindrical member with external threads cut thereon, two annular washers corresponding to the first two mounted adjacent said flange and a nut mounted on said threads having an inwardly extending flange which engages the end of the sleeve.

2. A wheel comprising the combination with a rim, of spokes detachably secured to said rim, the inner ends of said spokes being bent at an angle, the bent ends of alternate spokes being twice as long as the adjacent ones, a tubular member having a fixed flange thereon there being a plurality of openings formed in said fixed flange, a flange provided with corresponding openings splined on the other end of the tubular member means which engage and secure the entire portions of the bent ends of the spokes located adjacent said flanges, means to clamp said securing means and spokes and flanges rigidly together.

3. A wheel comprising the combination with a rim, of a tubular hub provided with a fixed flange at one end, and a plurality of spokes one-half of which have short bent ends, the other one-half having long bent ends, a flange splined upon the other end of said tubular hub, there being openings in said flanges in number corresponding to the number of spokes, an annular washer adjacent each of the flanges, said washers having angularly inclined peripheral slots the inner ends of which correspond with alternate apertures in the flanges, the spokes having short bent ends, being located in said slots, there being a plurality of apertures intermediate the said slots in register with the remaining apertures in the flanges, an annular washer for each of the flanges provided with angularly inclined peripheral slots, the inner ends of which are in register with the apertures in the first named washer, the spokes having long bent ends resting in said slots, the slots in the adjacent washers being divergent, means to clamp said washers and spokes securely in position.

In witness whereof I have signed the foregoing specification.

CHARLES G. TATE.

Witnesses:
C. M. BAUMEISTER,
K. DOLBEY.